United States Patent [19]

Holloway

[11] 4,100,154
[45] Jul. 11, 1978

[54] PROCESS FOR RECOVERY AND SEPARATION OF NUTRITIOUS PROTEIN HYDROLYSATE AND CHROMIUM FROM CHROME LEATHER SCRAP

[75] Inventor: Donald Francis Holloway, Milwaukee, Wis.

[73] Assignee: A. L. Gebhardt Company, Milwaukee, Wis.

[21] Appl. No.: 789,857

[22] Filed: Apr. 22, 1977

[51] Int. Cl.² ........................... A23J 1/10; C07G 7/00
[52] U.S. Cl. .................................. 260/123.7; 260/118
[58] Field of Search .............................. 260/118, 123.7

[56] References Cited

U.S. PATENT DOCUMENTS

| 837,016 | 11/1906 | Weiss | 260/118 |
|---|---|---|---|
| 882,481 | 3/1908 | Weiss | 260/118 |
| 967,215 | 8/1910 | Manns | 260/118 X |
| 1,285,474 | 11/1918 | Turner | 260/118 |
| 1,612,746 | 12/1926 | Rinck | 260/118 |
| 1,629,556 | 5/1927 | Underwood | 260/118 |
| 2,201,168 | 5/1940 | Glass | 260/118 |
| 2,349,542 | 5/1944 | Erdeley | 260/118 |
| 2,397,650 | 4/1946 | De Beukelaer | 260/118 |
| 3,232,924 | 2/1966 | Moses et al. | 260/118 |
| 3,355,444 | 11/1967 | Kalapatas et al. | 260/118 |

OTHER PUBLICATIONS

Kirk et al., Encyclopedia of Chemical Technology, vol. 10, 1967, pp. 504–506 & 610–614.
Encyclopedia of Polymer Science and Technology, vol. 7, 1968, pp. 451–453.

Primary Examiner—Howard E. Schain
Attorney, Agent, or Firm—Leydig, Voit, Osann, Mayer & Holt, Ltd.

[57] ABSTRACT

Nutritious water soluble protein hydrolysate having an average molecular weight between about 1500 and 10,000 is obtained by heating to at least about 200° F a mixture of, by weight: 100 parts chrome leather scrap; at least 100 parts water; and at least eight parts calcium oxide, calcium hydroxide, magnesium oxide, or magnesium hydroxide, with the proviso that at least 4.8 of these eight parts be calcium oxide or calcium hydroxide. Simultaneously, chromium is substantially insolubilized and precipitates. The protein is separated from the precipitated chromium compounds and neutralized with acid to provide a nutritious feed or feed supplement. The chromium is washed to remove all protein and dissolved in sulfuric acid to provide a chromium solution useful in tannery operations.

8 Claims, No Drawings

PROCESS FOR RECOVERY AND SEPARATION OF NUTRITIOUS PROTEIN HYDROLYSATE AND CHROMIUM FROM CHROME LEATHER SCRAP

BACKGROUND AND OBJECTS OF THE INVENTION

This invention relates to a process for obtaining useful products from chrome leather waste and to the products obtained thereby. More particularly, the invention relates to a process for converting chrome leather waste into protein hydrolysate and for simultaneously recovering chromium compounds.

As classified by source, there are two major categories of chrome leather scrap: one consists of pieces that are trimmed from chrome tanned hides and skins or fragmented when the chrome tanned hide is split into one or more layers; the other consists of shavings, dust or fiber bundles produced when the chrome tanned leather is machine shaved to a predetermined uniform thickness.

Chrome leather scrap, whether as shavings or pieces, may vary in moisture content from 60 percent down to 5 or ten percent depending upon the time it is stored after production and upon the conditions of storage. When completely dry, chrome leather scrap (unfinished by dyeing, fat liquoring, coloring or surface coating) contains approximately 3 to 4 percent chromium oxide ($Cr_2O_3$ equivalent); 12 to 15 percent other inorganic salts; 3 to 5 percent fats, oil, and chloroform solubles; and seventy-five to eighty percent protein (hide collagen). Although one might encounter some inconsistency in such analytical figures, it should be remembered that many salts normally present in chrome leather (e.g., ammonium and amine salts, carbonates, formates, acetates, and other salts of organic acids) decompose when ashed.

At the present time there is an accumulation of this chrome leather scrap amounting to about one million pounds per day in the United States alone. Although there are several known uses for this material, there is little present interest in these uses, and the material is therefore of little value.

It has been known for may years that the fibrous nature of chrome leather waste makes it suitable for reconstruction into leather-like sheet or board. Such products, however, have enjoyed little commercial use.

Attempts have also been made to utilize chrome leather waste as a slow acting fertilizer, but the value of chrome leather scrape as fertilizer is so low that it has not been possible to justify the payment of freight to convey it to a central point for processing. Further although the chromium remains insoluble and cannot leach into ground water levels, the use of chrome leather waste as a fertilizer has been criticized on the basis that the chromium level might build up to a toxic level. While there has never been any substantiation for such criticism, the fear that it may have some basis tends to further reduce the value of chrome leather waste as a fertilizer.

The Department of Agriculture has sanctioned the use of one percent leather meal in swine feed, even though one effect is to add the equivalent of about 200 ppm of chromium metal to the feed ration. Still, there is real doubt as the value of chrome leather as a feed additive. This doubt is based more on the questionable digestability of leather scrap than it is on toxicity.

Prior to the advent of resins and other synthetic polymer adhesives, animal glue was a major adhesive material and was much in demand. This led to an outlet for chrome leather waste because it could be processed so as to yield animal glue or technical gelatin. This process involved prolonged soaking in lime or magnesia suspension to fix the chromium as insoluble chromites, washing out the excess alkali with cold water and finally extracting the glue or gelatin by successive warm and hot water cooks. Obviously, very mild conditions were preferred because the value of the extracted protein was inversely proportional to the degree of hydrolysis encountered. Therefore, the treatment with lime or magnesia or both to fix the chromium was always carried out at low temperatures for prolonged periods of time totalling several weeks. Secondly, all possible excess alkalinity was neutralized and washed out prior to hot water extraction so as to prevent hydrolysis of the protein.

Because the foregoing uses are not currently of substantial commercial interest, chrome leather scrap has become a drug on the market, and it has a very low value. Indeed, we now find that millions of pounds of chrome leather pieces and shavings are disposed of by dumping into sanitary land fills. It has not even proved feasible to use this scrap for the recovery of its two to three percent chromium oxide content.

Accordingly, a principal object of this invention is to provide an economically valuable use for chrome leather scrap, and more particularly, to provide a process for converting substantially all of the protein in chrome leather scrap into a nutritious protein hydrolysate.

A related object is to provide such a protein hydrolysate that is substantially free of heavy metal contaminants.

Still another object is to provide an economical process for recovering the insoluble chromium compounds from chrome leather scrap.

Additional objects, if not specifically described herein, will be readily apparent to those skilled in the arts of processing hide material into leather, glue, gelatin, and related rendered products.

SUMMARY AND DETAILED DESCRIPTION OF THE INVENTION

In accordance with the present invention, the hide protein contained in chrome leather scrap is converted to an odorless, tasteless, and nutritious protein hydrolysate having little or no adhesive quality and an average molecular weight between about 1500 and 10,000 using a process of alkaline earth hydrolysis at elevated temperatures. In general, the hydrolysis may be carried out in any suitable container by external application of heat or direct injection of steam to a mixture of leather scrap, alkaline earth hydroxide, and water. The mixture is heated to a temperature of at least about 200° F. The time requiree for the hydrolysis can be reduced by the use of higher temperatures, in which case a pressure vessel may be used. Simultaneously with the hydrolysis, the chromium contained in the leather scrap is substantially insolubilized, thereby facilitating the separation of the chromium from the water soluble protein hydrolysate. The process involved in the present invention is distinguishable from conventional procedures for extracting glue and gelatine from leather scrap in that a substantially greater yield of protein hydrolysate is obtained and substantially complete separation of chromium compounds is achieved.

While any strong fixed alkali can be used to hydrolyze the chrome leather scrap, I have found that subsequent removal of the chromium from the hydrolysate is most difficult, and that it is practically impossible to prepare a protein hydrolysate containing less than 25–35 ppm of chromium unless alkaline earth hydrolysis is employed. Using the process described in this invention, the preparation of a protein hydrolysate containing less than 5 ppm of chromium on a dry basis is assured.

Hydroxides and oxides of calcium and magnesium are particularly applicable to the practice of this invention. These compounds are sufficiently to substantially completely hydrolyze the leather scrap; they neither introduce nor form toxic compounds; and they precipitate the insoluble chromium compounds in a form in which they can easily be flocculated and separated by settling, centrifugation or filtration. It should be noted that magnesium oxide or hydroxide must be used only in conjunction with calcium oxide or hydroxide, because the magnesium compounds do not generate sufficient alkalinity when used alone to effect complete break down of chrome leather scrap. The other members of the alkaline earth group are not used because of their toxicity or expense.

Calcium oxide or its hydroxide can be used as the sole hydrolyzing alkali provided it is used at sufficient levels to fix all the chromium as chromium hydroxide or calcium chromite. When magnesium oxide or hydroxide are used, they must be used in a minor amount in conjunction with a major amount of calcium oxide or hydroxide, or lime. Suitable weight ratios of magnesium compounds to line are from 10/90 to 40/60. Such mixtures of calcium and magnesium oxides or hydroxides produce a hydrolysate which is of lighter color, more readily flocculated for separation and practically devoid of any solubilized chromium. To obtain these advantages, at least ten parts of magnesium oxide or hydroxide per ninety parts of calcium oxide or hydroxide must be used.

Lime is the preferred alkali, because it is readily available at any location and at low cost; it is sufficiently alkaline (pH 11.0) to effect complete hydrolysis; the low solubility of many of its salts renders its removal relatively easy; lime residues are relatively easy to discard when this is necessary; and lime converts traces of fats to insoluble soaps for subsequent removal by skimming.

An important feature of the process of this invention is that the chrome compounds in the processed leather scrap can be removed. In order to obtain reusable chromium compounds from chrome leather scrap, it is necessary to effect substantially complete removal of protein from the insoluble chromium residues. When the protein is not substantially completely hydrolyzed and removed from the insolubilized chromium compounds, the resolution of the chrome in acid is of a violet color instead of the expected green and does not lend itself to subsequent percipitation by alkali. This violet color is indicative of the presence of excess protein which either has not been rinsed out, or has not been hydrolyzed to the point of being readily water soluble and extractable. The actual mechanism of the reaction which results in the violet coloration is not known but is probably one of the many varied color reactions between proteins and their hydrolysates with such heavy metals as iron, copper, chromium, etc.

The substantially complete hydrolysis achieved by the process of this invention makes it possible to achieve nearly complete extraction of the protein. This extraction can be achieved by successive water rinses or washes of the insoluble residue of precipitated chrome compounds. The chromium containing precipitate or sludge can then be converted to a usable basic chromium sulfate with sulfuric acid.

Depending upon the method used for separating the insolubilized chromium compounds from the protein hydrolysate, and upon the method of washing them to prepare the chromium compounds for resolution in acid, it is sometimes desirable to use relatively large excesses of water in the hydrolysis step. The more dilute the hydrolysate, the more easily are the precipitated chromium compounds separated with minimum retention of hydrolyzed protein. When less water is used, the hydrolysate is more concentrated, and more rinses must be employed to increase the yield of protein hydrolysate and remove it from the precipitated chromium compounds. In any case, at least 100 parts by weight of water per 100 parts by weight of leather scrap on a dry basis should be used in the hydrolysis step. Depending upon the overall concentration and viscosity of the hydrolysate, continuous, semicontinuous or batch methods which employ settling, centrifugation or filtration may be used to separate the chromium compounds from the hydrolysate. Irrespective of the method used, the separation is facilitated by dilution, heating and use of polymeric flocculants of the polyacrylamide type.

Although it is impossible to describe the protein hydrolysate produced by this invention on the basis of molecular weight, it suffices to describe the degree of protein hydrolysis by stating that the protein by this process is degraded to the point at which substantially all of the original collagen has been reduced to molecular weights between about 1500 and 10,000, and preferably below 5,000. The protein hydrolysates produced by the process of this invention are excellent ingredients for ruminant feeding. For this use, they may be fed as liquids or powders with or without blending with other nutrients. They may also be used in numerous other pet or livestock and poultry feeds with proper supplementation. As a source of nutrients for various fermentations in the production of antibiotics and related products, these materials offer several advantages. Another commercial use is in the retardation of the set of gypsum or plaster.

Several steps are optional in the preparation of these protein hydrolysates depending upon the use to which they will be put. Obviously, for some applications the removal of extraneous soluble salts and neutralization of the predominant alkalinity may be required. Thus, it may be desirable to include a preliminary step involving comminution of the leather scrap by means of a hammermill or an attrition mill in the presence of a stream of water so that soluble salts may be extracted and washed away prior to the hydrolysis step. Other preliminary washing and grinding steps can be employed as well.

This invention is illustrated by the following examples:

EXAMPLE I

A 100 lb. mixture of air-dry chrome leather shavings, splits and pieces were comminuted by suspending in water and running through an attrition mill to produce a fibrous mass that was dewatered by screening until solids were approximately twenty-five percent and the total weight was 400 lbs. Sixteen pounds of quicklime were mixed in and the whole was charged into a steam-jacketed pressure cooker. Using 20 lbs. gauge steam pressure, complete hydrolysis was effected in thirty minutes. After venting, the protein hydrolysate with suspended insoluble chromium compounds was treated with ten parts per million of Dow Separan AP 273, a water soluble organic polymer used as a flocculating agent, dissolved in a 0.02% solution. After flocculation, the slurry was filtered hot to yield fifty pounds of filter cake and 350 lbs. of protein hydrolysate containing 2 ppm of chromium and 20% hydrolyzed proteins in a clear solution. The 50 lbs. of filter cake were dissolved in concentrated sulfuric acid and allowed to stand for separation of calcium sulfate. The green supernate was subsequently used in the pickling operation prior to chrome tanning.

EXAMPLE II

This example was carried out exactly the same as Example I except for the replacement of four pounds of quicklime with four pounds of magnesium oxide. After flocculation and filtration, the filter cake weighed 53 lbs. and the protein hydrolysate weighed 355 lbs. The hydrolysate contained only 0.5 ppm of chromium and the filter cake was processed as in Example I. The use of magnesium hydroxide as a supplemental alkali effectively reduces the amount of dissolved chromium carried in the filtrate and lightens the color.

EXAMPLE III

Fifty pounds of chrome leather scrap as used in Examples I and II was added to a drum with ten gallons of water containing eight pounds calcium hydroxide and 2 pounds of magnesium oxide previously brought to a boil by live steam injection. The shavings were added at the boiling temperature and cooking was continued for 1 hours until the leather was completely hydrolyzed. Separan AP 273 was added as in previous examples and the insolubles were removed by filtering hot. The filter cake was washed twice with boiling water. Total volume of protein hydrolysate was 200 lbs. containing 8 percent hydrolyzed proteins and 0.2 ppm of chromium. The filter cake weighed 48 lbs. and when redissolved in sulfuric acid was utilized in a subsequent tanning operation as an adjunct to the pickling step.

EXAMPLE IV

A suspension of 32 pounds of lime and 4 pounds magnesium oxide in 250 pounds of water was brought to a rolling boil and chrome leather shavings were added as fast as they could be hydrolyzed until 250 pounds of shavings had been hydrolyzed. While still very hot, the slurry was treated with 20 ppm of Dow Separan SP 273 and filtered producing a cake of 52 pounds and 450 pounds of filtrate containing forty percent solids. The protein hydrolysate was neutralized to a pH of 8.5 with phosphoric acid and spray dried to produce an odorless white powder containing eight percent moisture, fifteen percent calcium and magnesium phosphates and seventy-seven percent protein equivalent.

EXAMPLE V

Example IV was repeated using twenty-four pounds of dolomitic lime (62% calcium hydroxide and 34% magnesium oxide) and sixteen pounds of calcium hydroxide. The final protein hydrolysate was practically identical with that obtained in Example IV after neutralization with phosphoric acid.

Countless other examples could be described covering many different amounts of water during hydrolysis, different ratios of calcium and magnesium hydroxides used to effect the breakdown, and different temperature-pressure-time ratios to effect complete hydrolysis of the leather and fixation of the chromium as an insoluble filterable precipitate. As to these variations the following generalizations can be made:

1. A more dilute hydrolysis reaction requires less washing of the filter cake.
2. A higher temperature of hydrolysis requires a shorter reaction time.
3. The amount of alkali must be, at least, eight percent of the leather weight, but 10 percent is optimum. Greater amounts serve no useful purpose unless the leather scrap contains excessive acidic materials.
4. The amount of magnesium oxide is preferably, at least, ten percent of the lime used and may be as high as twenty percent. Magnesium oxide is more expensive than lime, and there is no need to use greater quantities unless a portion of the alkali is dolomitic lime.
5. The practice of this invention using minimum amounts of water is limited only by the difficulty of subsequently separating the insoluble chromium compounds from the soluble hydrolyzed proteins. The minimum amount is 100 parts of water to 100 parts of leather on a dry basis.
6. Neutral hydrolysates can be produced using phosphoric acid as in Example IV or by using sulfuric, hydrochloric or carbonic acids depending upon the end use to which the hydrolysate is to be put.

For purposes of producing a feed or feed supplement, phosphoric acid is the preferred neutralizing agent because of the equivalence of calcium phosphates to bone meal. Other uses in fermentation reactions may permit the use of acetic, sulfuric or hydrochloric acids. Carbon dioxide is also preferred for neutralization, particularly if the product is to be spray dried to a non-caking powder.

Use of the protein hydrolysate in its alkaline form as calcium and magnesium proteinates is suitable for acylation with higher fatty acid chlorides in the production of surface active agents. Other uses for these collagen hydrolysates include capitalization of their colloidal properties as protective colloids, emulsifying agents, levelling agents, emulsion stabilizers, plaster retarders, etc.

I claim as my invention:

1. A process for making protein hydrolysate from chrome leather scrap which comprises the steps:
   (a) heating to a temperature above 200° F a mixture comprised of:
      (i) 100 parts by weight of chrome leather scrap,
      (ii) at least eight parts by weight of alkaline earth compound selected from the group consisting of calcium oxide and calcium hydroxide, and
      (iii) at least 100 parts by weight of water, until substantially all of the original collagen of the leather has been reduced to molecular weights between about 1500 and 10,000, thereby producing a water soluble protein hydrolysate and simultaneously converting substantially all of the chromium in the leather to water insoluble chromium compounds; and (b) separating the water soluble protein hydrolysate from the insoluble chromium compounds to provide:
  (i) a protein hydrolysate that is substantially free of chromium, and
  (ii) a residue of chromium compounds that is substantially free from protein.

2. The process of claim 1 in which the protein hydrolysate separated in step (b) is then neutralized with an acid selected from the group consisting of sulfuric acid, hydrochloric acid, phosphoric acid, carbonic acid, and acetic acid.

3. The process of claim 1 in which the mixture contains about 10 parts by weight of alkaline earth compound.

4. A process for making protein hydrolysate from chrome leather scrap which comprises the steps:
  (a) heating to a temperature above about 200° F a mixture comprised of
    (i) 100 parts by weight of chrome leather scraps,
    (ii) at least eight parts by weight of alkaline earth compound selected from the group consisting of calcium oxide, calcium hydroxide, magnesium oxide, and magnesium hydroxide, with the proviso that between ten and forty percent by weight of said alkaline earth compound be selected from the group consisting of magnesium oxide and magnesium hydroxide, and
    (iii) at least 100 parts by weight of water, until substantially all of the original collagen of the leather has been reduced to molecular weights between about 1500 and 10,000, thereby producing a water soluble protein hydrolysate, and simultaneously converting substantially all of the chromium in the leather to water insoluble chromium compounds; and
  (b) separating the water soluble protein hydrolysate from the insoluble chromium compounds to provide:
    (i) a protein hydrolysate that is substantially free of chromium, and
    (ii) a residue of chromium compounds that is substantially free from protein.

5. The process of claim 4 in which step (b) comprises the steps of (i) filtering to obtain a filtrate comprising protein hydrolysate that is substantially free of chromium, and a filter cake comprising insoluble chromium compounds, and (ii) rinsing the filter cake with water to remove substantially all protein, thereby producing a residue that can be dissolved in sulfuric acid to produce a usable chromium solution.

6. The process of claim 5 in which the separated protein hydrolysate is neutralized with an acid selected from the group consisting of sulfuric acid, hydrochloric acid, phosphoric acid, carbonic acid, and acetic acid.

7. The process of claim 1 in which step (a) is continued until substantially all of the original collagen is reduced to molecular weights below 5,000.

8. The process of claim 4 in which step (a) is continued until substantially all of the original collagen is reduced to molecular weights below 5,000.

* * * * *